United States Patent
Ogura et al.

(10) Patent No.: US 10,243,501 B2
(45) Date of Patent: Mar. 26, 2019

(54) INVERTER CONTROL DEVICE

(71) Applicant: Hitachi Automotive Systems, Ltd., Hitachinaka-shi, Ibaraki (JP)

(72) Inventors: Takashi Ogura, Hitachinaka (JP); Satoru Shigeta, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/754,465

(22) PCT Filed: Jul. 28, 2016

(86) PCT No.: PCT/JP2016/072095
§ 371 (c)(1),
(2) Date: Feb. 22, 2018

(87) PCT Pub. No.: WO2017/033657
PCT Pub. Date: Mar. 2, 2017

(65) Prior Publication Data
US 2018/0358917 A1 Dec. 13, 2018

(30) Foreign Application Priority Data
Aug. 27, 2015 (JP) .................................. 2015-167350

(51) Int. Cl.
*H02P 27/08* (2006.01)
*H02M 7/5395* (2006.01)
(Continued)

(52) U.S. Cl.
CPC .......... *H02P 27/085* (2013.01); *H02M 7/5395* (2013.01); *H02P 29/028* (2013.01); *H02P 29/032* (2016.02); *H02M 1/08* (2013.01)

(58) Field of Classification Search
CPC ........ H02P 27/08; H02P 27/06; H02P 29/032; H02P 27/085; H02P 29/028; H02P 6/12; H02M 2001/325; H02M 7/5395
See application file for complete search history.

(56) References Cited

U.S. PATENT DOCUMENTS 8,686,694 B2 * 4/2014 Funaba .................. B60K 6/445
307/109
8,976,551 B2 * 3/2015 Igarashi .................. B60L 3/003
363/56.02
(Continued)

FOREIGN PATENT DOCUMENTS

| JP | 2008-86088 A | 4/2008 |
|---|---|---|
| JP | 2012-32359 A | 2/2012 |
| JP | 2014-45549 A | 3/2014 |

OTHER PUBLICATIONS

International Search Report (PCT/ISA/210) issued in PCT Application No. PCT/JP2016/072095 dated Oct. 11, 2016 with English translation (Two (2) pages).
(Continued)

*Primary Examiner* — Bentsu Ro
*Assistant Examiner* — Thai Dinh
(74) *Attorney, Agent, or Firm* — Crowell & Moring LLP

(57) ABSTRACT

If a fault occurs in a buffer unit from which a PWM signal is outputted, an abnormal PWM signal may be outputted from the buffer unit. When a fault occurs in a first buffer unit, a fault detection unit detects a fault in the PWM signal being inputted via a second buffer unit. When the fault in the PWM signal is detected, the fault detection unit outputs a PWM fault signal to an arithmetic unit and the second buffer unit. In response to the input of the PWM fault signal, the second buffer unit sets the output thereof to high impedance and
(Continued)

drives the inverter circuit by a protection operation PWM signal to perform protection operation of a motor.

3 Claims, 5 Drawing Sheets

(51) Int. Cl.
    *H02P 29/032* (2016.01)
    *H02P 29/028* (2016.01)
    *H02M 1/08* (2006.01)

(56) References Cited

U.S. PATENT DOCUMENTS

| | | | |
|---|---|---|---|
| 2011/0309816 A1* | 12/2011 | Simon | H02M 5/293 |
| | | | 323/311 |
| 2013/0214745 A1* | 8/2013 | Funaba | B60K 6/445 |
| | | | 320/166 |
| 2015/0214872 A1 | 7/2015 | Kanekawa et al. | |
| 2018/0138694 A1* | 5/2018 | Garcha | H02H 7/1227 |

OTHER PUBLICATIONS

Japanese-language Written Opinion (PCT/ISA/237) issued in PCT Application No. PCT/JP2016/072095 dated Oct. 11, 2016 (Three (3) pages).

* cited by examiner

INVERTER CONTROL DEVICE

TECHNICAL FIELD

The present invention relates to an inverter control device.

BACKGROUND ART

A motor is driven by an inverter circuit which converts a DC voltage supplied from a power source into an AC voltage. To the inverter circuit, a PWM signal generated by an arithmetic unit is inputted via a buffer unit. The arithmetic unit feeds back the PWM signal outputted from the buffer unit to the arithmetic unit and detects a fault in the buffer unit. PTL 1 describes a circuit which is divided such that a fault in one phase of an inverter circuit does not affect other phases and switches a similar function for a common function across phases by setting an operation mode.

CITATION LIST

Patent Literature

PTL 1: JP 2014-45549 A

SUMMARY OF INVENTION

Technical Problem

In the conventional technique, when a fault occurs in the buffer unit from which the PWM signal is outputted, an abnormal PWM signal may be outputted from the buffer unit.

Solution to Problems

A inverter control device according to the present invention includes: an arithmetic unit which outputs a PWM signal for controlling a motor; a drive unit which receives the PWM signal outputted from the arithmetic unit via a buffer unit and drives an inverter unit based on the PWM signal received; and a feedback unit which receives the PWM signal outputted from the buffer unit and feeds back the PWM signal received to the arithmetic unit, in which the arithmetic unit outputs the PWM signal to the drive unit via the feedback unit when the buffer unit has a fault.

Advantageous Effects of Invention

According to the present invention, a more reliable inverter control device can be provided even if a fault occurs in the buffer unit which outputs the PWM signal.

DESCRIPTION OF EMBODIMENTS

Figure 1:
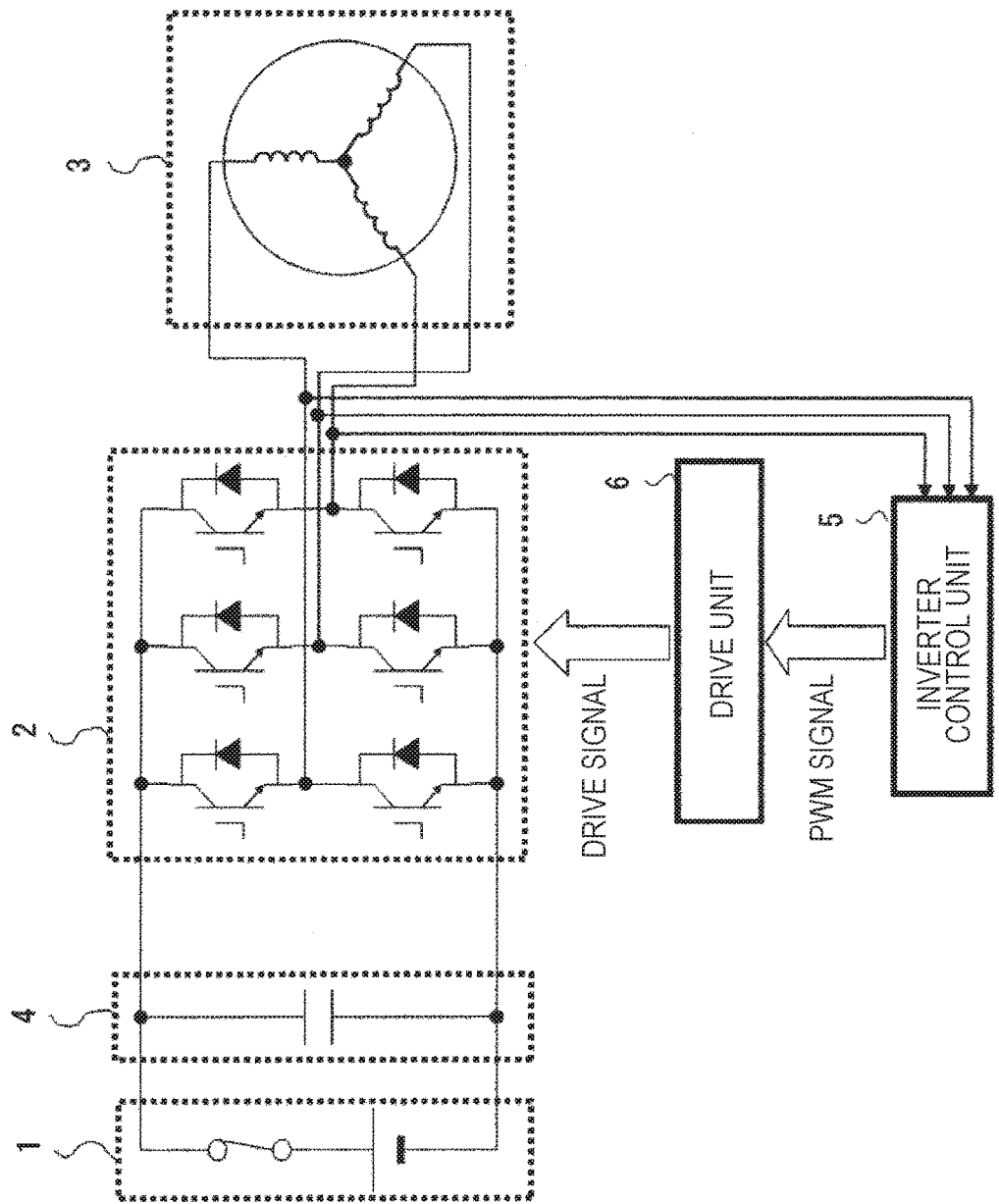
FIG. 1 is a diagram showing the overall system configuration.

FIG. 1 is a diagram showing the overall system configuration according to one embodiment of the present invention. The power of a DC power source 1 is supplied to an inverter circuit 2, and the inverter circuit 2 converts the power of the DC power source 1 from DC to AC and supplies the same to a motor 3. The inverter circuit 2 contains power semiconductor elements and diodes therein, a PWM signal outputted from an inverter control unit 5 is converted into a drive signal by a drive unit 6, and the power semiconductor elements are driven by this drive signal. A capacitor 4 suppresses the fluctuation of the DC voltage caused by the switching operation of the power semiconductor elements of the inverter circuit 2.

Figure 2:
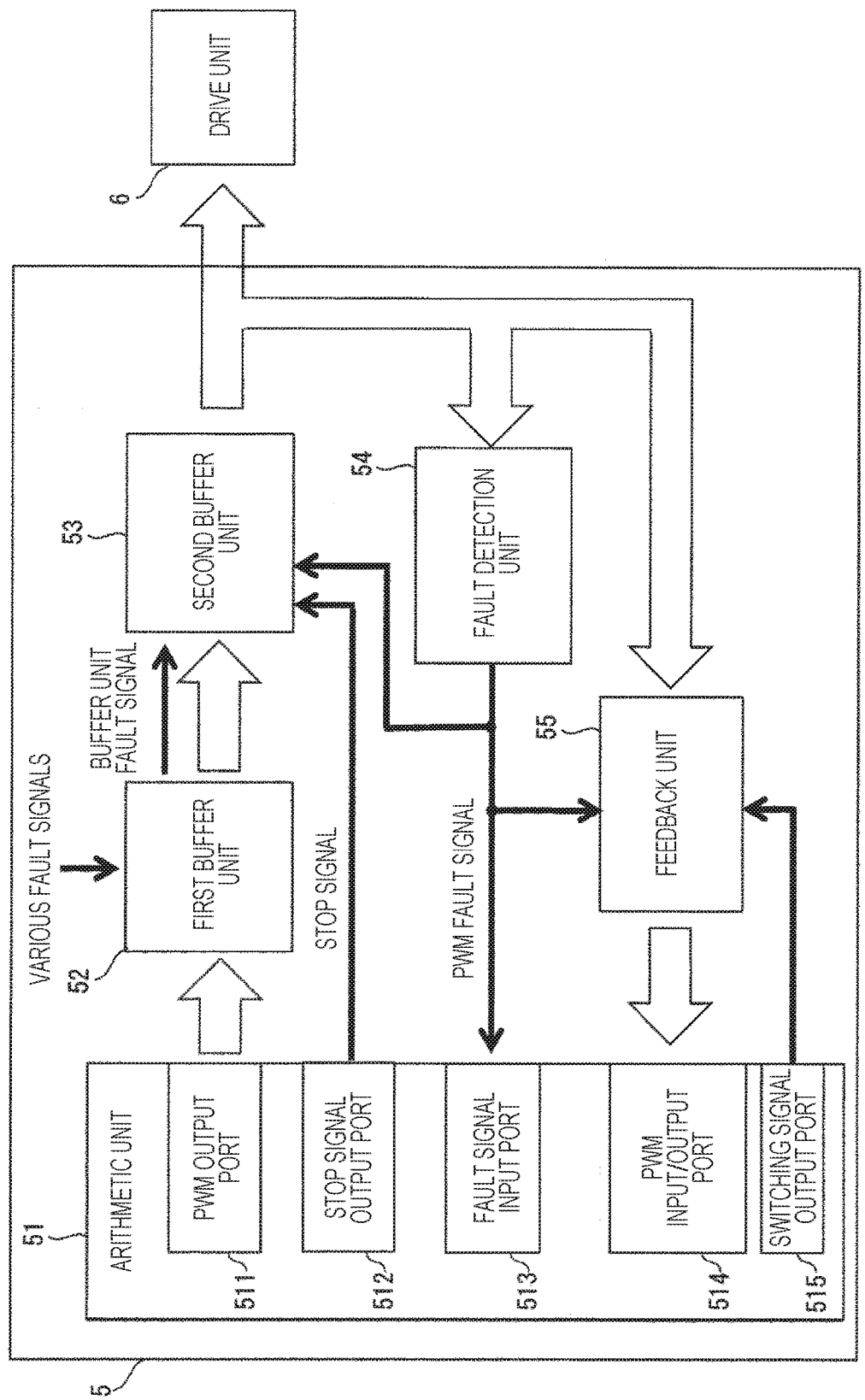
FIG. 2 is a block configuration diagram of an inverter control unit.

FIG. 2 is a block configuration diagram of the inverter control unit 5.

An arithmetic unit 51 is a microprocessor which generates a PWM signal, and the like. The arithmetic unit includes a PWM output port 511, a stop signal output port 512, a fault signal input port 513, a PWM input/output port 514 and a switching signal output port 515.

The PWM signal generated by the arithmetic unit 51 is outputted from the PWM output port 511 to a first buffer unit 52. Various fault signals are inputted to the first buffer unit 52 from a control circuit (not shown). The first buffer unit 52 outputs the received PWM signal to a second buffer unit 53 in a normal state in which various fault signals are not inputted. The second buffer unit 53 outputs the received PWM signal to the drive unit 6. Alternatively, at a time of fault when various fault signals are inputted, the first buffer unit 52 outputs a protection operation PWM signal to the second buffer unit 53, instead of the PWM signal from the arithmetic unit 51.

The first buffer unit 52 outputs a buffer unit fault signal to the second buffer unit 53 when the output function thereof has a fault. The fault in the output function is a fault due to a contact from the output terminal of the first buffer unit 52 to the power source or a fault due to a contact to the earth. If the PWM signal is outputted to the drive unit 6 with such a fault, the PWM signal outputted to the drive unit 6 is fixed to a high level or a low level so that it can be considered the inverter circuit 2 fixes the power semiconductor elements to be turned on. Then, when the power semiconductor elements are fixed to be turned on, an upper and lower short circuit occurs, leading to an overcurrent fault, in a case where an ON signal is inputted to one of the upper and lower arms as a pair.

When the buffer unit fault signal is inputted from the first buffer unit 52, the second buffer unit 53 generates the protection operation PWM signal and outputs the same to the drive unit 6. Thus, even when the first buffer unit 52 has a fault, it is possible to prevent erroneous PWM signals from being directly outputted. Note that the second buffer unit 53 is configured by a circuit with a lower fault rate than the first buffer unit 52. Moreover, the generation of the protection operation PWM signal in the second buffer unit 53 will be described later with reference to FIG. 3.

When a stop signal is inputted from the arithmetic unit 51, the second buffer unit 53 generates the protection operation PWM signal and outputs the same to the drive unit 6. Furthermore, when the PWM fault signal is inputted from a fault detection unit 54, the second buffer unit 53 generates the protection operation PWM signal and outputs the same to the drive unit 6.

The PWM signal outputted from the first buffer unit is inputted to the fault detection unit 54 via the second buffer unit 53. When the PWM output port 511 or the first buffer unit 52 has a fault, the fault detection unit 54 detects the fault based on the inputted PWM signal. In addition, a redundant PWM signal outputted from a feedback unit 55 is inputted to the fault detection unit 54. When the PWM input/output port 514 or the feedback unit 55 has a fault, the fault detection unit 54 detects the fault based on the inputted redundant PWM signal. When any one the faults is detected, the fault detection unit 54 outputs a PWM fault signal to the arithmetic unit 51 via the fault signal input port 513 and further to the second buffer unit 53 and the feedback unit 55. Note that the fault detection unit 54 does not detect a fault with respect to the protection operation PWM signal outputted from the second buffer unit 53.

To the feedback unit 55, a switching signal is inputted from the arithmetic unit 51 via the switching signal output port 515. In a normal state in which the switching signal is not inputted, the PWM signal outputted from the second buffer unit 53 is inputted to the feedback unit 55, and the feedback unit 55 transmits the inputted PWM signal to the arithmetic unit 51 via the PWM input/output port 514. On the other hand, when a switching signal is inputted, the feedback unit 55 transmits the redundant PWM signal outputted from the PWM input/output port 514 of the arithmetic unit 51 to the drive unit 6. The redundant PWM signal is a signal for driving power semiconductors, same as the PWM signal outputted from the PWM output port 511. However, since it is impossible to shift to safety operation by various fault signals which utilize the first buffer unit 52, output conditions of the redundant PWM signal may be limited.

For example, in a configuration with an overvoltage detector which generates an overvoltage fault signal for detecting the overvoltage of the DC power source 1, the output of the redundant PWM signal is allowed in a region lower than the DC power source voltage determined to be normal by the arithmetic unit 51 or an output current is limited. At this time, the relationship "overvoltage detector operation voltage>normal voltage determined by the arithmetic unit 51>output limitation voltage of the redundant PWM signal" is established. The sign of the overvoltage of the DC power source 1 is grasped earlier and the output is limited so as not to cause a fault due to the overvoltage. Note that the redundant PWM signal is set to have a higher priority than the protection operation PWM signal outputted from the second buffer unit 53. The feedback unit 55 blocks the redundant PWM signal when the PWM fault signal is inputted from the fault detection unit 54.

The arithmetic unit 51 receives, by the PWM input/output port 514, the PWM signal outputted from the feedback unit 55, and judges whether or not the PWM signal is abnormal. When the PWM signal is judged to be abnormal, the arithmetic unit 51 outputs a stop signal to the second buffer unit 53 from the stop signal output port 512.

Figure 3:
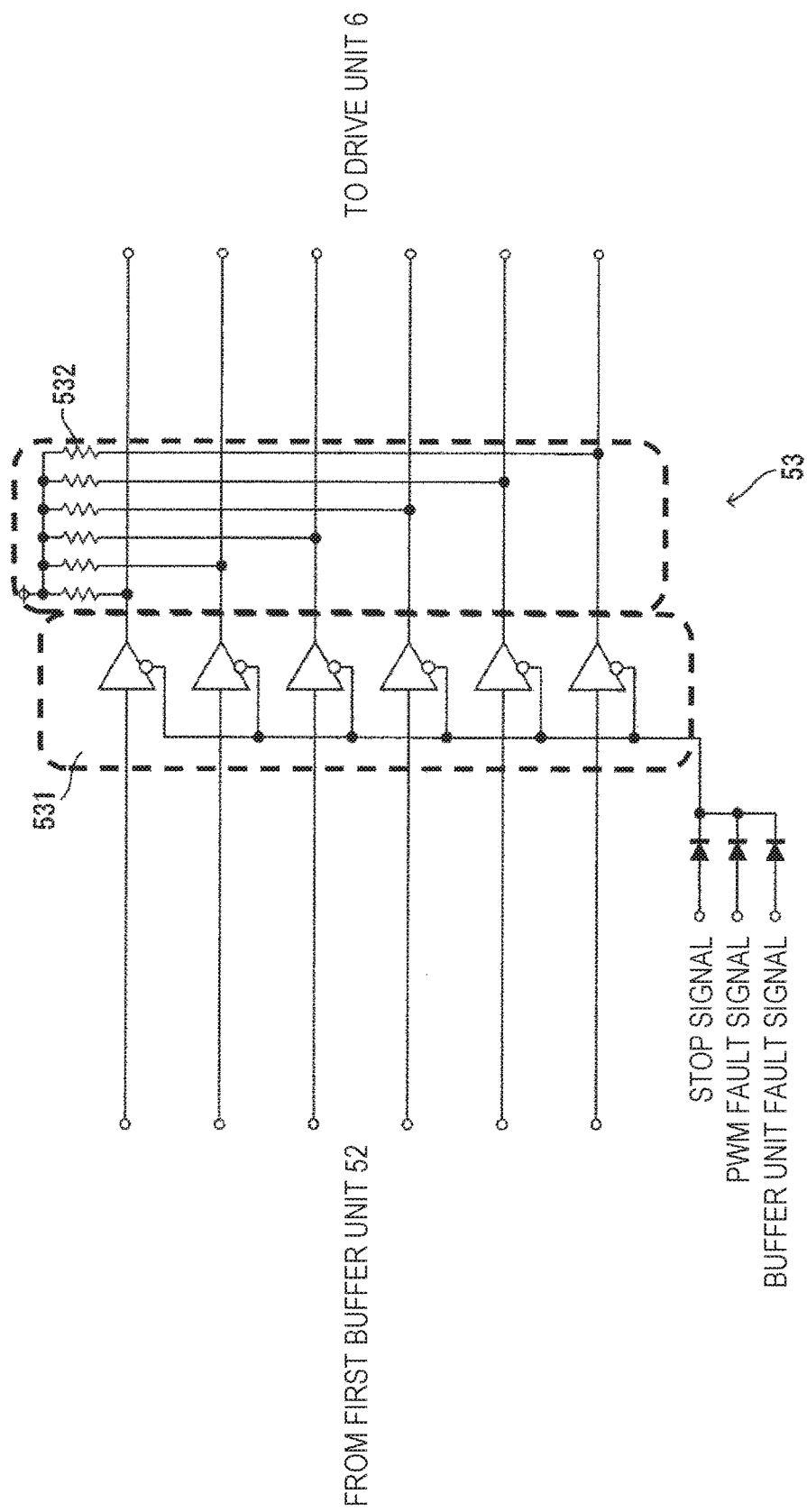
FIG. 3 is a circuit configuration diagram of a second buffer unit.

FIG. 3 is a circuit configuration diagram of the second buffer unit 53. A three-state buffer 531 is provided for each output line from the first buffer unit 52. Pull-up resistors 532 are provided for the output lines of the three-state buffers 531. The stop signal, the PWM fault signal and the buffer unit fault signal are OR-coupled and inputted to a control terminal of each three-state buffer 531. In a normal state, the three-state buffers 531 transmits the PWM signal from the first buffer unit 52 to the drive unit 6. When any one of the stop signal, the PWM fault signal and the buffer unit fault signal is inputted to the control terminals of the three-state buffers 531, the outputs of the three-state buffers 531 become high impedance. At this time, since the outputs of the three-state buffers 531 are in a high state (switched off), the motor 3 shifts to protection operation in a three-phase open state. In this manner, the PWM signal for performing the protection operation of the motor 3 is referred to as the protection operation PWM signal.

Figure 4:
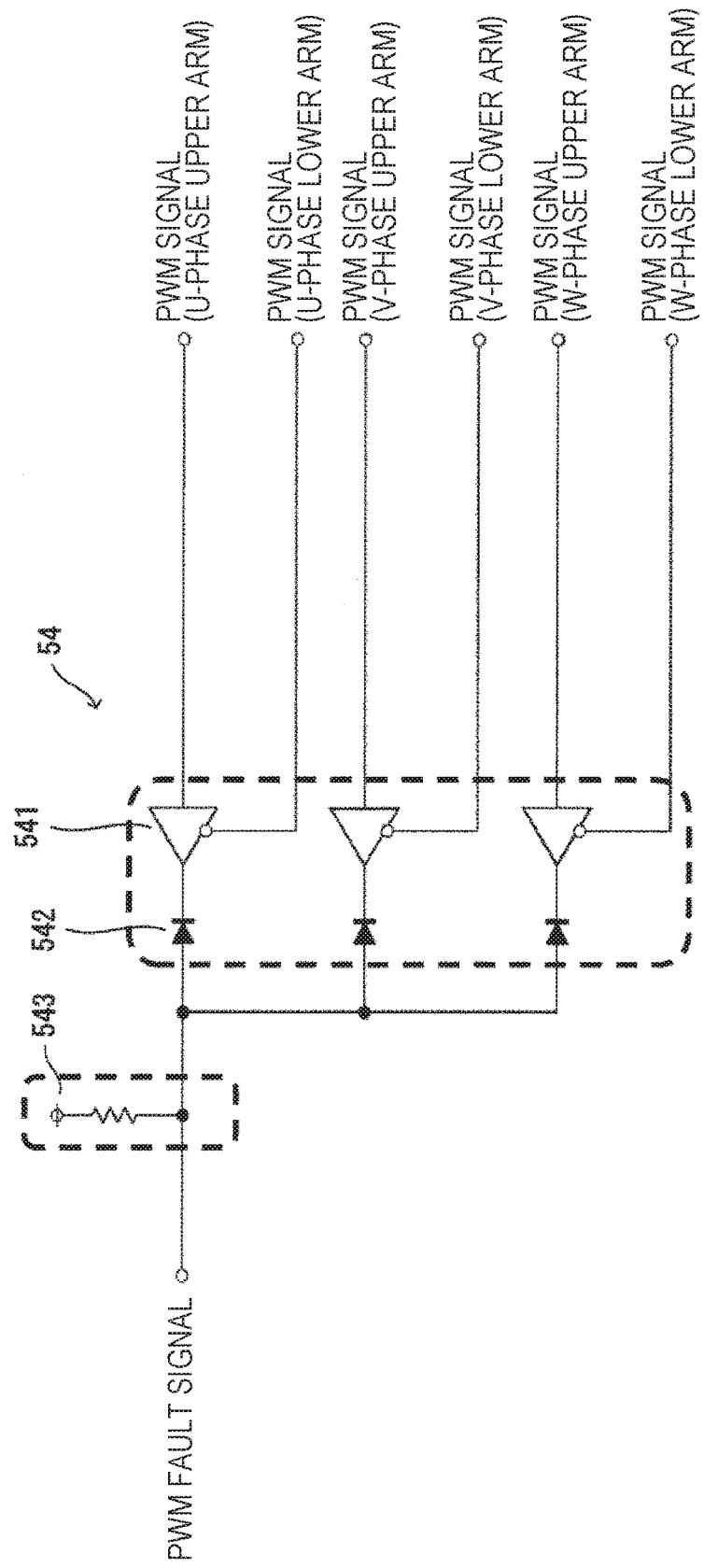
FIG. 4 is a circuit configuration diagram of a fault detection unit.

FIG. 4 is a circuit configuration diagram of the fault detection unit 54. Each output line of an upper arm of each phase of the PWM signal from the second buffer unit 53 is inputted to the respective three-state buffers 541. Also, each output line of a lower arm of each phase of the PWM signal from the second buffer unit 53 is inputted to the respective control terminals of the three-state buffers 541. The output lines of the three-state buffers 541 are connected to the respective cathodes of diodes 542. An anode of each diode 542 is coupled to one line and outputted as the PWM fault signal to the arithmetic unit 51, the second buffer unit 53 and the feedback unit 55. To stabilize the voltage of the PWM fault signal, the output lines of the PWM fault signal are connected to a pull-up resistor 543.

When at least any one of the outputs of the three three-state buffers 541 becomes low by the circuit configured by the three-state buffers 541 and the diodes 542, the PWM fault signal becomes low. Note that, in the inverter circuit 2, drive signals corresponding to respective PWM signals are inputted to the upper and lower arms of each phase. With the drive signal outputted when the PWM signal is low, the power semiconductor elements are controlled to be turned on, and with the drive signal outputted when the PWM signal is high, the power semiconductor elements are controlled to be turned off. In a normal state, the PWM signal of the lower arm paired with the upper arm of each phase does not control to be simultaneously low. This is because an overcurrent is generated when the upper and lower arms are simultaneously turned on.

The fault detection unit 54 detects the PWM signal which turns on the upper and lower arms simultaneously. When the PWM signal for the upper arm of any one of a U-phase, V-phase and W-phase and the PWM signal for the lower arms simultaneously become low (on), the PWM fault signal becomes low. When the PWM fault signal is low, a fault is determined.

When the U-phase upper arm is high and the U-phase lower arm is low, the outputs of the three-state buffers 541 become high. When the U-phase upper arm is low and the U-phase lower arm is high, the outputs of the three-state buffers 541 become high impedance. The three-state buffers 541 of the V-phase and W-phase to which PWM signal are inputted also operate in a similar manner. When all the outputs of the three three-state buffers 541 are high or high impedance outputs, the PWM fault signal becomes high. When any one of the three three-state buffers 541 is low output, the PWM fault signal becomes low.

Figure 5:
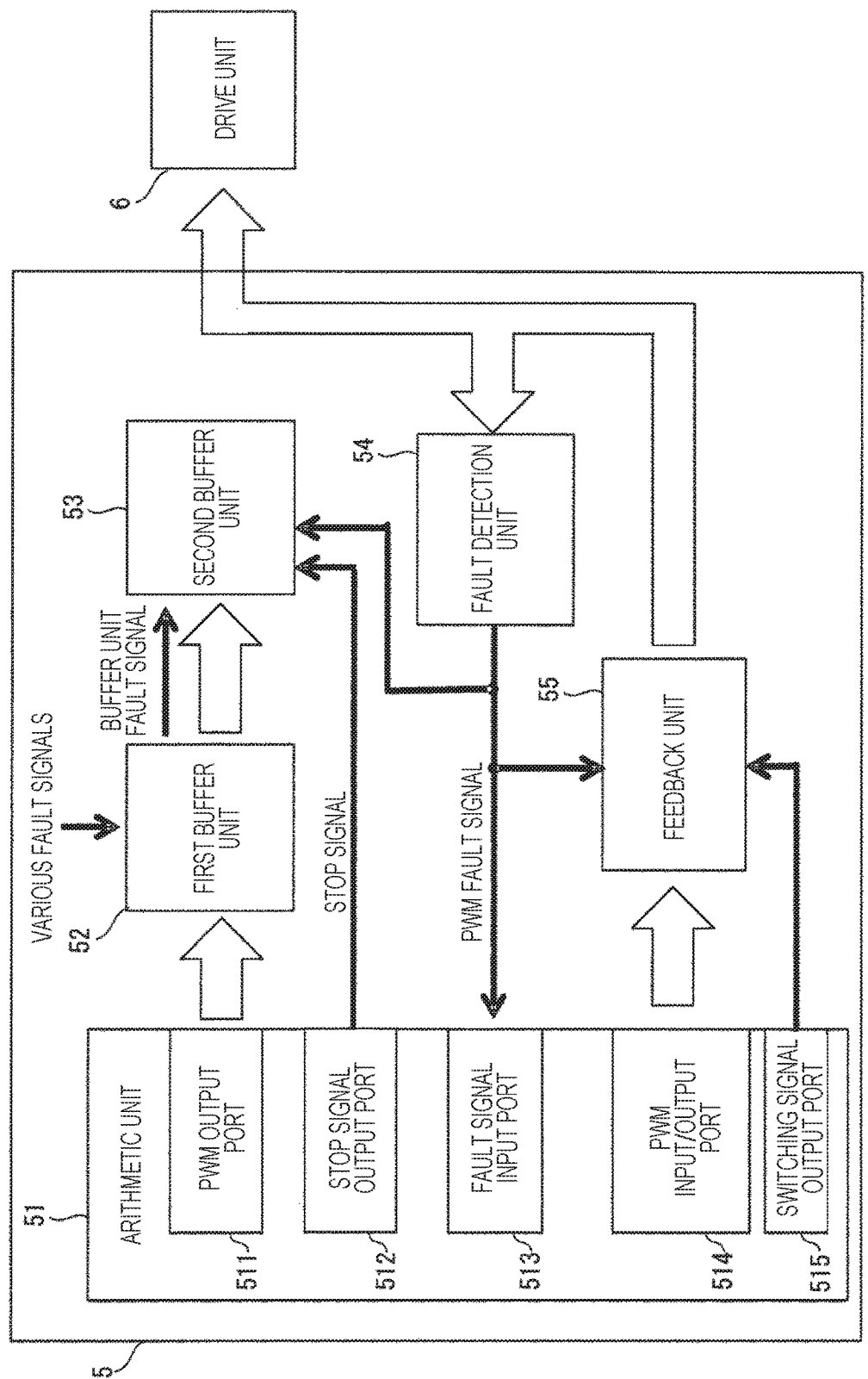
FIG. 5 is a diagram showing a state of the inverter control unit at a time of fault.

FIG. 5 is a diagram for illustrating a signal flow of the inverter control unit when the first buffer unit 52 has a fault. The block configuration of the inverter control unit is exactly the same as that in FIG. 2 so that the same reference signs are given, and the description thereof is omitted.

When a fault occurs in the first buffer unit 52, the fault detection unit 54 detects the fault in the first buffer unit 52 based on the PWM signal being inputted via the second buffer unit 53. When the fault in the first buffer unit 52 is detected, the fault detection unit 54 outputs the PWM fault signal to the arithmetic unit 51, the second buffer unit 53 and the feedback unit 55. In response to the input of the PWM fault signal, the second buffer unit 53 sets the output thereof to high impedance and drives the inverter circuit 2 by the protection operation PWM signal to perform the protection operation of the motor 3. Note that the second buffer unit 53 also drives the inverter circuit 2 by the protection operation PWM signal to perform the protection operation of the motor 3 when the buffer unit fault signal is inputted from the first buffer unit 52 or when the stop signal is inputted from the arithmetic unit 51.

In response to the input of the PWM fault signal, the arithmetic unit 51 generates the redundant PWM signal and outputs the same from the PWM input/output port 514. Then, the arithmetic unit 51 outputs the switching signal to the feedback unit 55. In response to the switching signal, the feedback unit 55 outputs the redundant PWM signal inputted from the arithmetic unit 51. The redundant PWM signal outputted from the arithmetic unit 51 via the feedback unit 55 is transmitted to the drive unit 6 in preference to the protection operation PWM signal outputted from the second buffer unit 53. Thereafter, the fault detection unit 54 receives the redundant PWM signal outputted via the feedback unit 55 and detects a fault based on the redundant PWM signal when the PWM input/output port 514 or the feedback unit 55 has a fault.

Thus, when a fault occurs in the first buffer unit 52, the inverter control unit 5 drives the inverter circuit 2 by the protection operation PWM signal to perform the protection operation of the motor 3, and then drives the inverter circuit 2 by the redundant PWM signal. Therefore, there is an effect of enhancing safety.

Moreover, when a fault in the PWM input/output port 514 or the feedback unit 55 is detected by the fault detection unit 54 based on an abnormality of the redundant PWM signal, the fault detection unit 54 outputs the PWM fault signal to the arithmetic unit 51, the second buffer unit 53 and the feedback unit 55, as in the case where the fault in the first buffer unit 52 is detected. In response to the input of the PWM fault signal, the feedback unit 55 blocks the redundant PWM signal from the arithmetic unit 51. Thus, the protection operation PWM signal outputted from the second buffer unit 53 becomes effective, and the protection operation of the motor 3 is performed.

In this manner, when the redundant PWM signal becomes abnormal, the inverter control unit 5 blocks the redundant PWM signal and drives the inverter circuit 2 by the protection operation PWM signal to perform the protection operation of the motor 3. Therefore, there is an effect of enhancing safety.

According to the embodiments described above, the following operational effects can be obtained.

(1) The inverter control unit 5 includes: the arithmetic unit 51 which outputs the PWM signal for controlling the motor 3; the drive unit 6 which receives the PWM signal outputted from the arithmetic unit 51 via the first buffer unit 52 and drives the inverter circuit 2 based on the PWM signal received; and the feedback unit 55 which receives the PWM signal outputted from the first buffer unit 52 and feeds back the PWM signal received to the arithmetic unit 51, in which the arithmetic unit 51 outputs a redundant PWM signal to the drive unit 6 via the feedback unit 55 when the first buffer unit 52 has a fault. Thus, a more reliable inverter control device can be provided even if a fault occurs in the first buffer unit 52 which outputs the PWM signal.

The present invention is not limited to the embodiments described above, and other forms, which can be considered within the scope of the technical idea of the present invention, are also included within the scope of the present invention as long as the features of the present invention are not impaired.

REFERENCE SIGNS LIST

1 DC power source
2 inverter circuit
3 motor
4 capacitor
5 inverter control unit
6 drive unit
51 arithmetic unit
52 first buffer unit
53 second buffer unit
54 fault detection unit
55 feedback unit

The invention claimed is:

1. An inverter control device, comprising:
   an arithmetic unit which outputs a PWM signal for controlling a motor;
   a drive unit which receives the PWM signal outputted from the arithmetic unit via a buffer unit and drives an inverter unit based on the PWM signal received; and
   a feedback unit which receives the PWM signal outputted from the buffer unit and feeds back the PWM signal received to the arithmetic unit,
   wherein the arithmetic unit outputs the PWM signal to the drive unit via the feedback unit when the buffer unit has a fault.

2. The inverter control device according to claim 1, further comprising:
   a fault detection unit which receives the PWM signal outputted from the buffer unit and detects the fault in the buffer unit,
   wherein the arithmetic unit outputs the PWM signal to the drive unit via the feedback unit when the fault in the buffer unit is detected by the fault detection unit.

3. The inverter control device according to claim 2, wherein, when the buffer unit has the fault, the fault detection unit receives the PWM signal outputted via the feedback unit and detects a fault in the feedback unit.

* * * * *